Oct. 8, 1968 R. L. DILLS 3,405,253
COMBINED FRONT HEATING AND INSULATING MEANS FOR
SELF-CLEANING OVEN
Filed Sept. 12, 1966
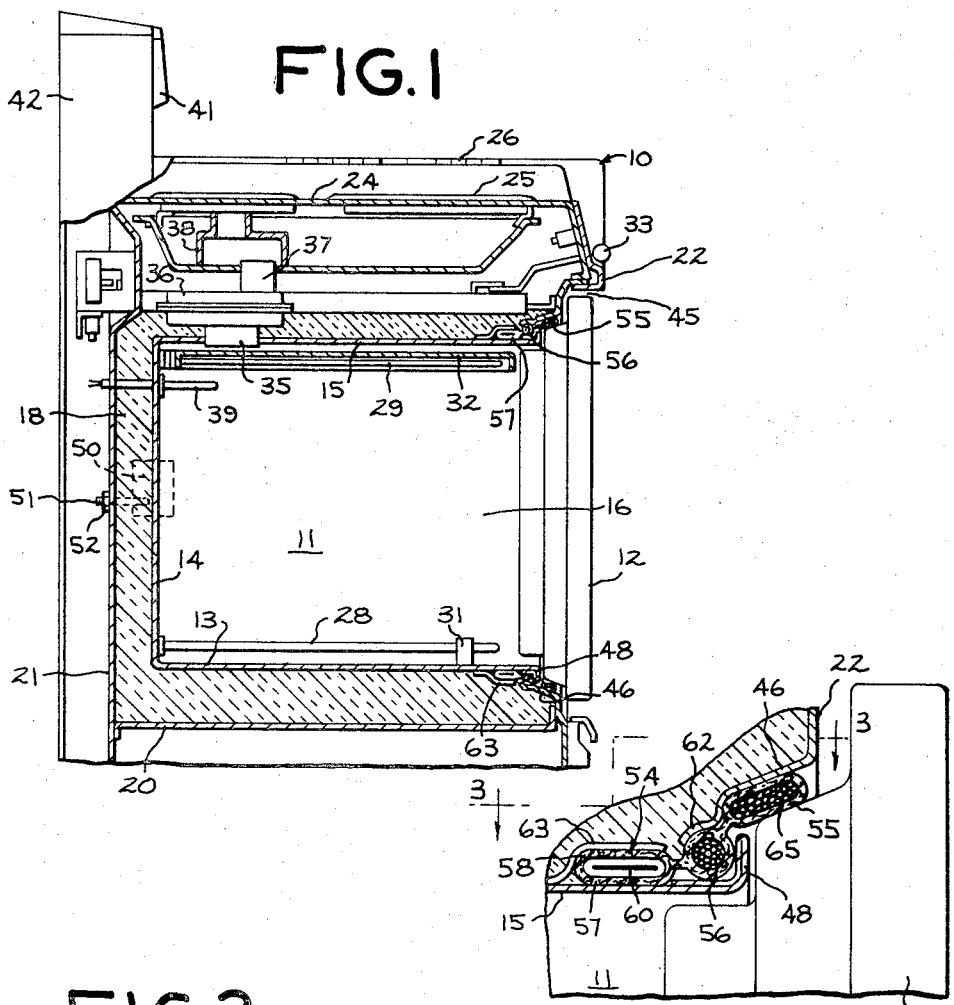
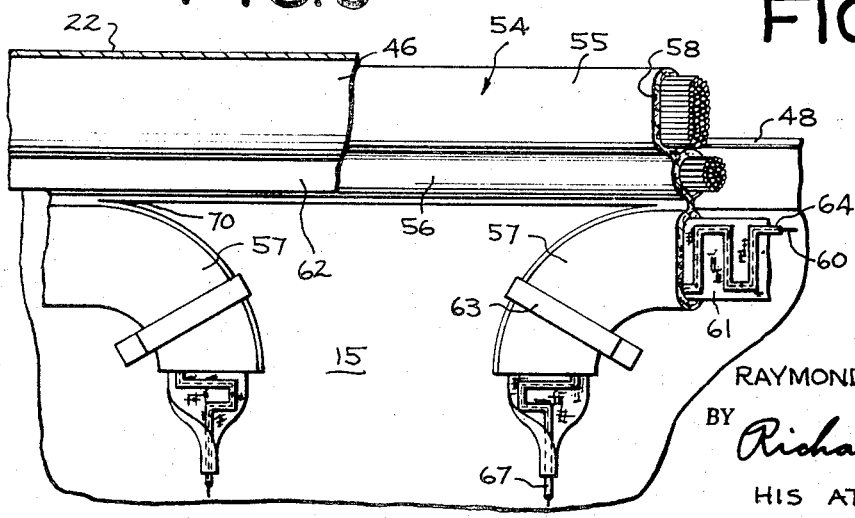
INVENTOR
RAYMOND L. DILLS
BY Richard L. Caslin
HIS ATTORNEY

United States Patent Office 3,405,253
Patented Oct. 8, 1968

3,405,253
COMBINED FRONT HEATING AND INSULATING MEANS FOR SELF-CLEANING OVEN
Raymond L. Dills, Louisville, Ky., assignor to General Electric Company, a corporation of New York
Filed Sept. 12, 1966, Ser. No. 578,566
3 Claims. (Cl. 219—413)

The present invention relates to ovens for cooking foods, and particularly to a combined heating and insulating means for the front of a self-cleaning oven for obtaining generally uniform oven wall temperatures as well as restricting the amount of heat lost through and around the oven door.

This invention is related to an automatic, self-cleaning oven using a pyrolytic process at a high temperature range, preferably between about 750° F. and about 950° F. as disclosed and claimed in the patent of Bohdan Hurko, No. 3,121,158, which is assigned to the General Electric Company, the assignee of the present invention. One of the many important features conceived by Hurko was the use of an additional heating means or mullion heater adjacent the front of the oven liner for compensating for heat lost through and around the oven door during the heat cleaning cycle.

The present invention also involves an improvement in the tension mounting means combined with a mullion heater as taught in the patent of J. K. Newell, Jr., No. 3,017,488, which is also assigned to the assignee of the present invention. In the Newell design, the mullion heater is sandwiched between an annular lip of the oven liner and a rear flange of a separate breaker frame which is interposed between the annular lip of the oven liner and the peripheral edge of a front opening in the oven housing.

The principal object of the present invention is to provide an oven with a combined door gasket, breaker strip and mullion heater so as to retard the loss of heat around the oven door, retard the conduction of heat from the oven liner to the oven housing and finally to provide supplementary heat around the periphery of the front portion of the oven liner.

A further object of the present invention is to provide an oven with a mullion or perimeter heater around the front of the oven liner, and combining with the mullion heater a breaker strip of insulating material to serve as a spacer between the front of the oven liner and the oven housing, as well as providing the breaker strip with a door gasket extension for sealing the gap between the oven door and the front wall of the oven housing.

The present invention, in accordance with one form thereof, is embodied in the subcombination of a combined door gasket, breaker strip and mullion heater all arranged in a close parallel formation and held together by a common jacket of high temperature, flexible, nonmetallic material. The core of both the door gasket and the breaker strip are of high temperature, flexible, nonmetallic filler material, while the core of the mullion heater is a flexible, insulated electrical resistance heating element. The mullion heater is adapted to be in thermal contact with the outside of the oven liner. The breaker strip is adapted to be interposed between an annular lip at the front of the oven liner and a peripheral edge of an opening in the oven housing, and finally the door gasket is adapted to be sandwiched between the oven body and the oven door in its closed position.

My invention will be better understood from the following description taken in conjunction with the accompanying drawing and its scope will be pointed out in the appended claims.

FIGURE 1 is a fragmentary left-side elevational view of an electric range having a self-cleaning oven embodying the present invention with some parts broken away and others in cross-section to show the principal elements at the front of the oven liner.

FIGURE 2 is an enlarged fragmentary view in the vicinity of the front of the oven liner at the top thereof showing the nature of a combined door gasket, breaker strip and mullion heater embodying the present invention.

FIGURE 3 is a top plan view of the combined door gasket, breaker strip and mullion heater taken on the line 3—3 of FIGURE 2 showing the nature of the terminations for the mullion heater.

Turning now to a consideration of the drawing, and in particular to FIGURE 1, there is shown an electric range 10 having as its principal component a box-like oven liner 11 in combination with a front-opening access door 12 which form an oven cooking cavity. The oven liner 12 is of sheet metal construction having a bottom wall 13, a back wall 14, top wall 15 and opposite side walls 16. The front of the oven liner is open and is adapted to be closed by the door 12.

As in standard oven designs, a layer of thermal insulating material 18 such as fiber glass or the like completely surrounds the oven liner on all five sides and serves to retain the heat present in the oven cavity so as to render the oven thermally efficient. A sheet metal insulation guard 20 is positioned beneath the oven for supporting the insulation, and similar vertical panels 21, as seen at the back of the oven, support the insulation at the back and the two sides thereof. The oven is further provided with an outer casing or oven housing 22 with a decorative external finish, such as porcelain enamel, to enclose the entire oven assembly.

This invention is shown for illustrative purposes as being a part of a complete electric range 10 having a top cooking surface or cooktop 24 assembled over the oven and including a plurality of surface heating units 25 formed of metal sheathed resistance heating elements, as is conventional in this art. Each surface heating unit 25 is provided with a multiple pushbutton selector switch 26 along one side edge of the cooktop 24 for controlling the amount of heating energy available to the respective heating unit. The oven cavity is provided with two heating elements; namely, a lower baking element 28 and an upper boiling element 29, which are each in a form of a metal sheathed resistance heating element that is bent into a large loop and is provided with two terminal ends which extend through the back wall 14 of the oven liner for making electrical connections therewith. The baking element 28 is provided with a plurality of supporting clips or feet 31 for holding the baking element of the range off the bottom wall 13 so as not to develop hot spots that might otherwise damage the porcelain enamel finish which covers the interior surface of the oven liner. The upper broiling element 29 is provided with a pan-shaped reflector 32 which overlies the broiling element and serves to direct the radiant energy downwardly into the oven cavity as well as to shield the upper wall 15 of the oven liner from the intense heat.

As in standard baking and broiling ovens, the oven cavity would be provided with one or more oven racks that are adapted to be supported on rack-supporting embossments or ledges on the opposite side walls 16, 16, but these are not illustrated in the drawings since they do not form part of the present invention. Moreover, the oven door 12 is made of several pan-shaped sheet metal panels that are fastened together in a unitary structure, and its interior is substantially filled with thermal insulating material (not shown) such as fiberglass or the like so that the oven heat is retained within the cooking cavity during the heat cleaning cycle as well as for obtaining uniform cooking results no matter where the food might be placed on the oven racks.

Other elements illustrated in the drawing but which do not form a part of the present invention will be listed here briefly for ease in understanding the environment in which the present invention is located. First, there is a door latch handle 33 which is used for locking the oven door 12 during the high tempearture heat cleaning cycle. A typical door latch mechanism is illustrated in the patent of Clarence Getman, 3,189,375, which is also assigned to the assignee of the present invention. Next, the oven cavity is provided with a venting system at the rear thereof having an exhaust duct 35 in the top wall 15 of the oven liner so that the gaseous degradation products formed during cooking and cleaning may be exhausted to the outside of the oven. Interposed in this exhaust duct 35 is a catalytic oxidation unit 36 which serves both as a smoke and odor eliminator. There is an exhaust port 37 from the oxidation unit and it discharges into a labyrinth formed by duct work 38 which eventually discharges beneath one of the rear surface heating units 25 of the cooktop 24. Preferably, an oxidation unit will be used of the type that is disclosed in the patent of Stanley B. Welch, 2,900,483, which patent is also assigned to the assignee of the present invention.

A standard oven thermostatic control system comprises a temperature sensor such as a probe 39 which is mounted at the top portion of the back wall 14 of the oven liner 11. The probe is a tubular member with a coil of a nickel or platinum resistance wire (not shown) wound therein and which is electrically connected by suitable lead wires to an electrical responder, shown diagrammatically in FIGURE 1 as element 41, that is assembled in a control panel of a backsplash 42 arranged along the rear edge of the cooktop 24.

Mention will not be made of the technique of supporting the oven liner 11 in the oven housing 22. As seen in both FIGURES 1 and 2, the front panel of the oven housing 22 is provided with a large rectangular opening 45 that is internally framed by a beveled flange 46 which extends inwardly in a converging manner. The front edge of the inner oven liner 11 is provided with an outwardly directed annular lip 48 which is formed by rolling over the edge and doubling it under as is best seen in FIGURE 2. This forms a reinforced flange that is capable of withstanding a strong tension force that is to be applied at the back of the oven liner.

A bracket member 50 is fastened to each side wall 16 of the oven liner at the rear thereof, and there is a J-bolt 51 which extends forwardly through the insulation guard 21 and insulation 18 and is provided with an adjusting nut 52 such that the tightening of the nut will shorten the effective length of the bolt and exert a pulling force against the back of the oven liner tending to draw the annular lip 48 of the oven liner toward engagement with the innermost edge of the beveled flange 46 that frames the opening 45 in the oven housing 22. This method is quite similar to the method of supporting the oven liner in standard ovens.

As is best illustrated in FIGURE 2, the present invention relates to a subassembly 54 comprising a combined door gasket 55, a breaker strip 56 and a mullion heater 57. All three elements 55, 56 and 57 are arranged in a close parallel formation and are held together by a common jacket 58 of high temperature, flexible, nonmetallic material such as fiber glass or the like. Both the door gasket 55 and the breaker strip 56 are provided with a thick core of high temperature flexible, nonmetallic filler material such as fiber glass so as to give these two elements sufficient body and resilience. The core of the mullion heater 57 is generally flattened and it has a flexible, electrical resistance heating element 60 of serpentine shape which is sewn between two insulating tapes 61. This heating element 60 has a thin sheath of fiber glass insulation 64 or the like to help in insulating the heater.

The breaker strip 56 has a generally circular transverse cross-section and it is sandwiched between the back side of the annular lip 48 of the oven liner 11 and the innermost edge 62 of the beveled surface 46 framing the front opening 45 in the oven housing 22. The mullion heater 57 extends rearwardly of the breaker strip 56 and it is adapted to be in good thermal contact with the perimeter of the oven liner. Suitable clip members 63 are used at widely spaced points around the oven liner for holding the mullion heater in place.

Extending frontwardly from the breaker strip 56 is the door gasket 55. It also has a generally flattened or oval configuration, and it is adapted to lie against the beveled surface 46 and extend for generally the complete length of the beveled surface for abutting against a mating surface 65 on the inner side of the oven door 12.

Notice in FIGURE 3 that the terminals of the mullion heater 57 are located at the top of the oven liner and that a slit 70 is made in the connecting web of the jacket 58 between the mullion heater and the breaker strip so that the mullion heater may be separated from the breaker strip in this area so that the heater terminals may be spaced from each other. Electrical terminals 67 are fastened to the ends of the heating element 60 in a conventional manner.

Having described above my invention of a combined door gasket, breaker strip and mullion heater for use with a high temperature self-cleaning oven, it will readily be apparent to those skilled in this art that this combined assembly is a flexible member of heavy rope-like nature which is easy to fabricate, convenient to store and ship, and simple to apply to the oven construction. It eliminates the need for a separate breaker frame, it retards the conduction of heat to the front of the oven housing and it simplifies the method of fastening these three elements in place over the methods used heretofore.

Modifications of this invention will occur to those skilled in this art therefore it is to be understood that this invention is not limited to the particular embodiments disclosed but that it is intended to cover all modifications which are within the true spirit and scope of the invention as claimed.

What I claim as new and desire to secure by Letters Patent of the United States is:

1. An oven comprising an oven liner of box-like construction with a front opening for gaining access thereto, an oven housing surrounding the oven liner and including a layer of thermal insulation to insulate the housing from the oven liner, the oven housing also having a front opening for receiving the oven liner therethrough, an oven door mounted at the front of the oven for closing the front opening of the oven liner, an outwardly extending annular lip formed on the oven liner near the front thereof, tension means at the back of the oven housing for pulling against the oven liner so that the said annular lip of the oven liner is drawn toward the edge of the said opening in the front of the oven housing; the invention comprising a combined door gasket, breaker strip and mullion heater with a high temperature, flexible, nonmetallic jacket material surrounding the three combined elements, high temperature filler material comprising the core of both the door gasket and breaker frame, and a resistance heating element forming the core of the mullion heater, the mullion heater portion encircling the front of the oven liner and in thermal contact therewith, the breaker strip being sandwiched between the annular lip of the oven liner and the peripheral edge of the front opening in the oven housing, the door gasket being adapted to be disposed between the front of the oven housing and the inside surface of the oven door.

2. An oven comprising a hollow oven housing, an opening in a front wall of the housing, a box-like oven liner extending into said housing through said opening, the oven liner also having a front opening, an oven door mounted at the front of the oven for closing the front opening of the oven liner, a layer of insulation surrounding the oven liner, an outwardly extending annular lip formed on the front perimeter of the oven liner, adjustable fastening means at the back of the oven housing for drawing the annular lip of the oven liner toward the peripheral edge of the front opening of the oven housing; the invention comprising a subassembly of a combined door gasket, breaker strip and mullion heater, and a high temperature, woven jacket encompassing the said three elements in a close parallel arrangement, both the door gasket and the breaker strip having a core of flexible, high temperature, nonmetallic material, while the mullion heater has a generally flattened core of an electrical resistance heater element, where the breaker strip is the center element and confined between the said annular lip and the edge of the front opening of the oven housing, the mullion heater being disposed inwardly of the breaker strip, and means for holding the mullion heater into direct contact with the oven liner, the door gasket being disposed outwardly of the breaker strip and against the front wall of the oven housing so as to be engaged by the oven door in its closed position.

3. The subcombination of a combined door gasket, breaker strip and mullion heater all arranged in a close parallel formation and held together by a common jacket of high temperature, flexible, nonmetallic material, both the door gasket and the breaker strip having a thick core of high temperature, flexible, nonmetallic filler material, while the mullion heater has a generally flattened core of a flexible, insulated electrical resistance heating element, the said combined door gasket, breaker strip and mullion heater being of substantial length as compared with its width.

References Cited
UNITED STATES PATENTS

| | | | |
|---|---|---|---|
| 3,099,259 | 7/1963 | Newell | 126—196 |
| 3,082,311 | 3/1963 | Chisholm | 219—413 |
| 3,121,158 | 2/1964 | Hurko | 219—397 |
| 3,060,212 | 11/1962 | Hurko | 219—399 |

BERNARD A. GILHEANY, *Primary Examiner.*

H. B. GILSON, *Assistant Examiner.*